(12) United States Patent
Yeh

(10) Patent No.: US 8,079,929 B2
(45) Date of Patent: Dec. 20, 2011

(54) DIFFERENTIAL FOR MODEL CAR

(75) Inventor: Chun-Min Yeh, Taichung (TW)

(73) Assignee: Topway Model Research Co., Ltd., Taichung (TW)

( * ) Notice: Subject to any disclaimer, the term of this patent is extended or adjusted under 35 U.S.C. 154(b) by 623 days.

(21) Appl. No.: 12/206,957

(22) Filed: Sep. 9, 2008

(65) Prior Publication Data

US 2009/0215572 A1 Aug. 27, 2009

(30) Foreign Application Priority Data

Feb. 21, 2008 (TW) ................................ 97203057 U

(51) Int. Cl.
*F16H 48/06* (2006.01)
(52) U.S. Cl. ....... 475/230; 475/150; 475/234; 74/606 R; 74/607
(58) Field of Classification Search .................. 475/150, 475/230, 234; 74/606 R, 607
See application file for complete search history.

(56) References Cited

U.S. PATENT DOCUMENTS

| 4,959,043 A * | 9/1990 | Klotz et al. ............ 475/230 |
| 6,450,296 B1 * | 9/2002 | Seki et al. ............ 184/6.12 |
| 2010/0093482 A1 * | 4/2010 | Allmendinger et al. ...... 475/234 |

* cited by examiner

Primary Examiner — Justin Holmes
Assistant Examiner — Huan Le
(74) Attorney, Agent, or Firm — Browdy and Neimark, PLLC

(57) ABSTRACT

A differential for a model car includes a housing having a chamber, four notches recessed in a periphery of the chamber and each having a trapezoid section, four blocks received in the notches respectively, a spider having four ends connected with the blocks respectively, four first bevel gears respectively sleeved on the ends of the spider, two second bevel gears received in the chamber and engaged with the first bevel gears respectively, a main gear sleeved on the housing, and two output shafts respectively passing through the main gear and the housing to be connected with the second bevel gears. Thus, the first bevel gears and the second bevel gears can be tightly engaged with each other by means of the arrangement of the spider and the blocks to eliminate the power loss of the model car.

3 Claims, 2 Drawing Sheets

DIFFERENTIAL FOR MODEL CAR

BACKGROUND OF THE INVENTION

1. Field of the Invention

The present invention relates generally to a model car, and more specifically to a differential for a model car, which can eliminate power loss of the model car.

2. Description of the Related Art

In a model car without a differential, the inner driving wheel and the outer driving wheel are forced to rotate at the same speed such that the model car is difficult to corner. Thus, a differential is generally used in a power transmission system of a model car to allow the rotational speed of the outer driving wheel to be larger than that of the inner driving wheel.

FIG. 1 shows a conventional differential 1 for a model car, which comprises a housing 2 having a chamber 3 therein, four notches 6 recessed in a periphery of the chamber 3 and arranged in a crisscross manner, two large bevel gears 4a and 4b received in the chamber 3 and respectively connected with output shafts 8a and 8b, a spider 5 having four ends respectively inserted in the notches 6, and four small bevel gears 7 respectively sleeved on one end of the spider 5 and engaged with the large bevel gears 4a and 4b. As a result, when the power generated by an engine is transmitted to a main gear 9, a part of the power will be transmitted to the output shaft 8a connected with the main gear 9, and other part of the power will be transmitted to the output shaft 8b through the large bevel gear 4a, the small bevel gears 7, and the large bevel gear 4b such that the driving wheels of the model car can be allowed to rotate at different speeds by the engagement transmission of the large bevel gears 4a and 4b and the small gears 7.

However, when the model car corners, the inner driving wheel may suspend in midair due to the centrifugal force and spin such that the reduction gear ratio between the inner driving wheel and the outer driving wheel will exceed the initial set value. In order to prevent the power loss of the model car caused by the spinning inner driving wheel, the spider 5 will be moved to make the small bevel gears 7 and the large bevel gears 4a and 4b engage with each other; nevertheless, the ends of the spider 5 are respectively inserted in the notches 6 of the housing 2 such that they will rub the periphery walls of the notches 6 when the spider 5 is moved. After the differential 1 is used for a long time, the notches 6 will be gradually widened because of the constant friction, causing the looseness of the spider 5. As a result, the small bevel gears 7 can't be tightly engaged with the large bevel gears 4a and 4b when the model car corners, resulting in idle spinning of the inner driving wheel and the power loss of the model car.

SUMMARY OF THE INVENTION

The present invention has been accomplished in view of the above-noted circumstances. It is one objective of the present invention to provide a differential for a model car, which can prevent the interior components of the model from damage.

It is another objective of the present invention to provide a differential for a model car, which can prevent an inner driving wheel of the model car from idle spinning and eliminate the power loss of the model car when the model car corners.

To achieve these objectives of the present invention, the differential comprises a housing, four blocks, a spider, four first bevel gears, two second bevel gears, a main gear, and two output shafts. The housing has a chamber therein and four notches recessed in a periphery of the chamber and arranged in a crisscross manner. Each notch has a trapezoid section to define a top side and a bottom side that is longer than said top side. Each block is received in one of the notches of the housing. The spider has four ends connected with the blocks respectively. The first bevel gears are respectively sleeved on the four ends of the spider. The second bevel gears are received in the chamber of the housing and respectively engaged with the first bevel gears. The main gear is sleeved on the housing. One of the output shafts passes through the main gear to be connected with one of the second bevel gears, and the other one of the output shafts passes through the housing to be connected with the other one of the second bevel gears.

Accordingly, the differential of the present invention can prevent the spider and the notches from damage because of the presence of the blocks and allow the first bevel gears and the second bevel gears to be tightly engaged with each other through the arrangement of the spider and the blocks to eliminate the power loss of the model car.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
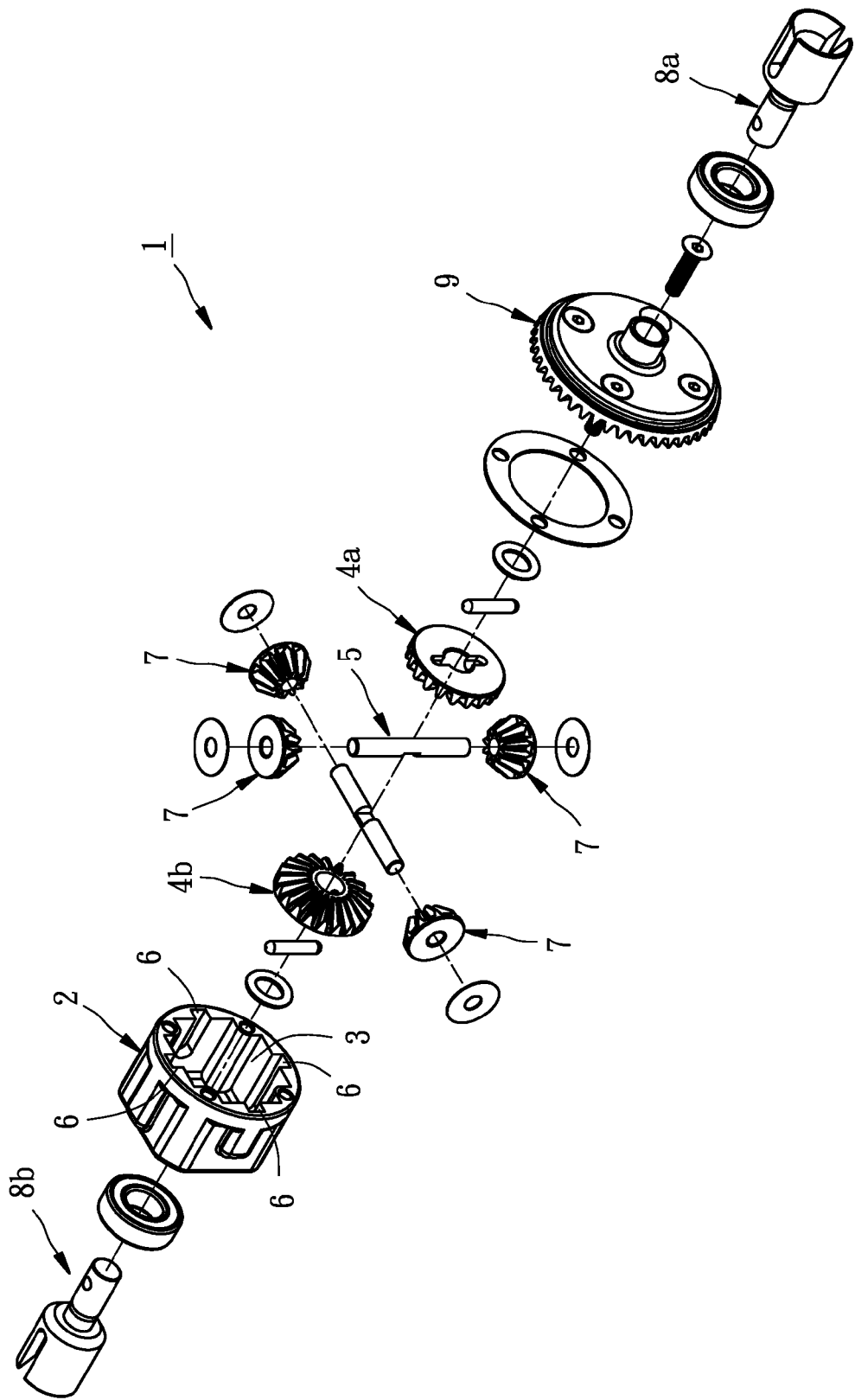
FIG. 1 is an exploded view of a differential according to a prior art.
Figure 2:
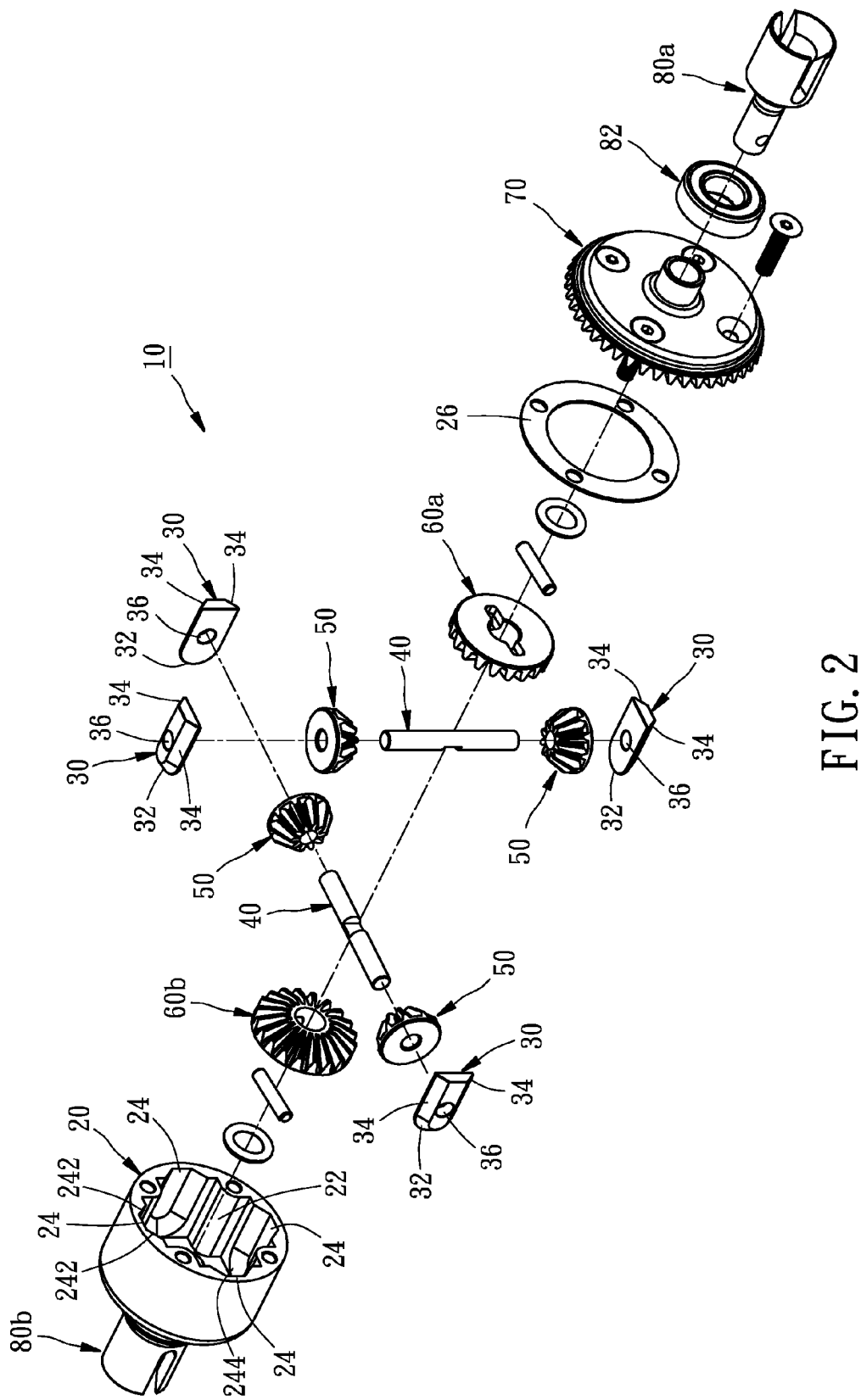
FIG. 2 is an exploded view of a differential according to a preferred embodiment of the present invention.

As shown in FIG. 2, a differential 10 for a model car in accordance with a preferred embodiment of the present invention comprises a housing 20, four blocks 30, a spider 40, two pairs of first bevel gears 50, a pair of second bevel gears 60a and 60b, a main gear 70, and a pair of output shafts 80a and 80b.

The housing 20 has a chamber 22 therein and four notches 24 recessed in a periphery of the chamber 22 and arranged in a crisscross manner. The notches 24 each have a curved end 244 and an isosceles trapezoid section to define a top side, a bottom side that is longer than the top side, and two first bevel sides 242.

The blocks 30 are received in the chamber 22 of the housing 20 with a cover 26 fastened to the housing 20, each having a curved end 32, two second bevel sides 34, and a circular hole 36 such that each block 30 can be received in each notch 24 in such a way that the second bevel sides 34 of each block 30 are abutted against the first bevel sides 242 of each notch 24.

The spider 40 is received in the chamber 22 of the housing 20 and provided with four ends respectively inserted in the holes 36 of the blocks 30.

The first bevel gears 50 are respectively sleeved on one end of the spider 40.

The second bevel gears 60a and 60b are received in the chamber 22 of the housing 20 and respectively engaged with the first bevel gears 50.

The main gear 70 is sleeved on the housing 20.

The output shaft 80*a* passes through a bearing 82 and the main gear 70 to be connected with the second bevel gear 60*a*, and the output shaft 60*b* passes through the other bearing (not shown) and the housing 20 to be connected with the second bevel gear 60*b*. When power generated by an engine is transmitted to the main gear 70, a part of the power is transmitted to the output shaft 80*a* connected with the main gear 70, and other part of the power is transmitted to the output shaft 80*b* through the second bevel gear 60*a*, the first bevel gears 50, and the second bevel gear 60*b* such that driving wheels of the model car can be allowed to rotate at different speeds by the engagement transmission of the first bevel gears 50 and the second bevel gears 60*a* and 60*b*.

When the model car corners, the inner driving wheel may suspend in midair due to the centrifugal force. Under this circumstances, the spider 40 will be moved to drive the blocks 30 to move synchronously because of the junction of the spider 40 and the blocks 30 such that the spider 40 won't directly bump against the notches 24, preventing the spider 40 and the notches 24 from damage; and further, the blocks 30 can be driven by the spider 40 to move smoothly relative to the notches 24 through the first bevel sides 242 and the second bevel sides 34. As a result, the first bevel gears 50 and the second bevel gears 60*a* and 60*b* can be tightly engaged with each other by means of the arrangement of the spider 40 and the blocks 30 to reduce the rotational speed of the inner driving wheel of the model car, thereby preventing the inner driving wheel from idle spinning and eliminating the power loss of the model car.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential for a model car, comprising:
   a housing having a chamber, and four notches recessed in a periphery of said chamber and arranged in a crisscross manner, each said notch having a trapezoid section to define a top side and a bottom side that is longer than said top side;
   four blocks each received in one of said notches of said housing;
   a spider having four ends connected with said blocks respectively;
   four first bevel gears respectively sleeved on said four ends of said spider;
   two second bevel gears received in said chamber of said housing and engaged with said first bevel gears respectively;
   a main gear sleeved on said housing; and
   two output shafts, one of said output shafts passing through said main gear and being connected with one of said second bevel gears, and the other one of said output shafts passing through said housing and being connected with the other one of said second bevel gears; and
   wherein each of said blocks has a trapezoid section mating with the trapezoid section of a respective one of said notches.

2. The differential as claimed in claim 1, wherein said blocks each have a hole for insertion of one of said ends of said spider.

3. The differential as claimed in claim 1, wherein said blocks each have a curved end.

\* \* \* \* \*